(12) United States Patent
Driscoll et al.

(10) Patent No.: US 9,365,281 B2
(45) Date of Patent: Jun. 14, 2016

(54) REDUCING CONDENSATION IN DIMMABLE WINDOW SYSTEMS

(71) Applicant: Gentex Corporation, Zeeland, MI (US)

(72) Inventors: David I. Driscoll, Caledonia, MI (US); Bradley L. Busscher, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 14/547,564

(22) Filed: Nov. 19, 2014

(65) Prior Publication Data
US 2015/0138622 A1   May 21, 2015

Related U.S. Application Data

(60) Provisional application No. 61/906,186, filed on Nov. 19, 2013.

(51) Int. Cl.
| | |
|---|---|
| *G02F 1/153* | (2006.01) |
| *G02F 1/15* | (2006.01) |
| *B64C 1/14* | (2006.01) |
| *B64D 45/00* | (2006.01) |

(52) U.S. Cl.
CPC ......... *B64C 1/1492* (2013.01); *B64D 2045/006* (2013.01)

(58) Field of Classification Search
USPC .................................. 359/270–280, 296, 265
See application file for complete search history.

(56) References Cited

U.S. PATENT DOCUMENTS

| | | | |
|---|---|---|---|
| 4,640,583 | A | 2/1987 | Hoshikawa et al. |
| 4,646,158 | A | 2/1987 | Ohno et al. |
| 4,702,566 | A | 10/1987 | Tukude |

(Continued)

FOREIGN PATENT DOCUMENTS

| | | |
|---|---|---|
| EP | 0947874 A2 | 10/1999 |
| EP | 0947875 A2 | 10/1999 |

(Continued)

OTHER PUBLICATIONS

Patent Cooperation Treaty, International Searching Authority, International Search Report, Written Opinion of the International Searching Authority and Notification of Transmittal, Feb. 19, 2015, 6 Pages.

(Continued)

*Primary Examiner* — Mohammed Hasan
(74) *Attorney, Agent, or Firm* — Price Heneveld LLP; Scott P. Ryan

(57) ABSTRACT

An aircraft window mounting assembly having a pressure pane in abutting contact with an inner surface of an exterior pressure pane frame. A bezel is proximate a periphery of the pressure pane and defines an inner opening. The bezel includes an inner wall, an outer wall, an exterior wall, and an interior wall. A dust cover is proximate the interior wall of the foam bezel. An electro-optic element is disposed in the opening and is configured for reception by the inner wall. The pressure pane, the foam bezel, and the electro-optic element define an exterior cavity. The bezel, the electro-optic element, and the dust cover define an interior cavity. A first relief passage is in fluid communication with the exterior cavity and the interior cavity. A second relief passage is in fluid communication with the interior cavity and one of an aircraft interior cabin and an aircraft wall.

20 Claims, 2 Drawing Sheets

(56) References Cited

U.S. PATENT DOCUMENTS

| | | | |
|---|---|---|---|
| 4,893,908 A | 1/1990 | Wolf et al. |
| 4,902,108 A | 2/1990 | Byker |
| 4,917,477 A | 4/1990 | Bechtel et al. |
| 5,004,961 A | 4/1991 | Berner et al. |
| 5,066,111 A | 11/1991 | Singleton et al. |
| 5,092,939 A | 3/1992 | Nath et al. |
| 5,124,832 A | 6/1992 | Greenberg et al. |
| 5,136,419 A | 8/1992 | Shabrang |
| 5,161,048 A | 11/1992 | Rukavina |
| 5,202,787 A | 4/1993 | Byker et al. |
| 5,228,925 A | 7/1993 | Nath et al. |
| 5,233,461 A | 8/1993 | Dornan et al. |
| 5,384,578 A | 1/1995 | Lynam et al. |
| 5,384,653 A | 1/1995 | Benson et al. |
| 5,612,847 A | 3/1997 | Malecke et al. |
| 5,654,736 A | 8/1997 | Green et al. |
| 5,657,149 A | 8/1997 | Buffat et al. |
| 5,724,176 A | 3/1998 | Nishikitani et al. |
| 5,724,187 A | 3/1998 | Varaprasad et al. |
| 5,725,809 A | 3/1998 | Varaprasad et al. |
| 5,805,330 A | 9/1998 | Byker et al. |
| 5,838,483 A | 11/1998 | Teowee et al. |
| 5,884,865 A | 3/1999 | Scherer et al. |
| 5,889,608 A | 3/1999 | Buffat et al. |
| 5,995,273 A | 11/1999 | Chandrasekhar |
| 6,020,989 A | 2/2000 | Watanabe |
| 6,039,390 A | 3/2000 | Agrawal et al. |
| 6,045,724 A | 4/2000 | Varaprasad et al. |
| 6,055,089 A | 4/2000 | Schulz et al. |
| 6,056,410 A | 5/2000 | Hoekstra et al. |
| 6,084,702 A | 7/2000 | Byker et al. |
| 6,166,496 A | 12/2000 | Lys et al. |
| 6,207,083 B1 | 3/2001 | Varaprasad et al. |
| 6,210,008 B1 | 4/2001 | Hoekstra et al. |
| 6,245,262 B1 | 6/2001 | Varaprasad et al. |
| 6,254,003 B1 | 7/2001 | Pettinelli et al. |
| 6,407,847 B1 | 6/2002 | Poll et al. |
| 6,471,360 B2 | 10/2002 | Rukavina et al. |
| 6,567,708 B1 | 5/2003 | Bechtel et al. |
| 6,906,632 B2 | 6/2005 | DeLine et al. |
| 6,924,919 B2 | 8/2005 | Hunia et al. |
| 7,130,101 B2 | 10/2006 | Rukavina et al. |
| 7,663,798 B2 * | 2/2010 | Tonar ................ B60Q 1/2665 359/265 |
| 7,738,155 B2 | 6/2010 | Agrawal et al. |
| 7,990,603 B2 | 8/2011 | Ash et al. |
| 8,104,715 B2 | 1/2012 | Brownjohn et al. |
| 8,164,818 B2 | 4/2012 | Collins et al. |
| 8,270,059 B2 | 9/2012 | Friedman et al. |
| 2002/0041424 A1 | 4/2002 | Lynam |
| 2002/0113168 A1 | 8/2002 | Rukavina et al. |
| 2004/0160660 A1 | 8/2004 | Malvino |
| 2005/0063036 A1 | 3/2005 | Bechtel et al. |
| 2005/0083577 A1 | 4/2005 | Varaprasad et al. |
| 2005/0156753 A1 | 7/2005 | DeLine et al. |
| 2005/0200933 A1 | 9/2005 | Weidner |
| 2005/0200935 A1 | 9/2005 | Liu et al. |
| 2006/0285190 A1 * | 12/2006 | Agrawal ................ G02F 1/153 359/265 |
| 2007/0002420 A1 | 1/2007 | Rukavina et al. |
| 2008/0230653 A1 | 9/2008 | Mitchell et al. |
| 2009/0002803 A1 | 1/2009 | Tonar et al. |
| 2009/0296190 A1 * | 12/2009 | Anderson ............... B32B 27/06 359/247 |
| 2010/0230543 A1 | 9/2010 | Bruce et al. |
| 2011/0051219 A1 | 3/2011 | Agrawal et al. |
| 2011/0063708 A1 | 3/2011 | Letocart |
| 2012/0217346 A1 | 8/2012 | Eberle et al. |
| 2013/0161971 A1 | 6/2013 | Bugno et al. |
| 2014/0268288 A1 * | 9/2014 | Driscoll .................... E06B 9/24 359/275 |
| 2015/0029574 A1 * | 1/2015 | Driscoll ................ B64C 1/1492 359/275 |

FOREIGN PATENT DOCUMENTS

| | | |
|---|---|---|
| EP | 0947876 A2 | 10/1999 |
| RU | 2389641 | 5/2010 |
| WO | WO 98/57228 | 12/1998 |

OTHER PUBLICATIONS

R. Sullivan et al., "Effect of Switching Control Strategies on the Energy Performance of Electrochromic Windows," SPIE, vol. 2255, 14 pages, (Feb. 1994).

A.W. Czanderna et al., "Durability Issues and Service Lifetime Prediction of Electrochromic Windows for Buildings Applications," Solar Energy Materials & Solar Cells, 56 (1999), 18 pages, February.

Patent Cooperation Treaty Communication, mailed Dec. 21, 2007, 13 pages.

Communication from the European Patent Office, Supplementary European Search Report, Mailed Aug. 8, 2010, (9 pages).

* cited by examiner

US 9,365,281 B2

REDUCING CONDENSATION IN DIMMABLE WINDOW SYSTEMS

CROSS-REFERENCE TO RELATED APPLICATION

This application claims priority under 35 U.S.C. §119(e) to U.S. Provisional Patent Application No. 61/906,186, filed on Nov. 19, 2013, entitled "REDUCING CONDENSATION IN DIMMABLE WINDOW SYSTEMS," which is incorporated herein by reference in its entirety.

BACKGROUND OF THE DISCLOSURE

The present disclosure generally relates to an aircraft window mounting assembly, and more specifically, to an aircraft window mounting assembly that includes an electro-optic element and electromagnetic shielding.

SUMMARY OF THE PRESENT DISCLOSURE

One aspect of the present disclosure includes an aircraft window mounting assembly having a pressure pane in abutting contact with an inner surface of an exterior pressure pane frame. A bezel is proximate a periphery of the pressure pane and defines an inner opening. The bezel includes an inner wall, an outer wall, an exterior wall, and an interior wall. The inner wall includes a channel. A dust cover is proximate the interior wall of the bezel. An electro-optic element is disposed in the opening and is configured for reception in the channel of the inner wall. The pressure pane, the bezel, and the electro-optic element define an exterior cavity. The bezel, the electro-optic element, and the dust cover define an interior cavity. A first relief passage is in fluid communication with the exterior cavity and the interior cavity. A second relief passage is in fluid communication with the interior cavity and one of an aircraft interior cabin and an aircraft wall.

Another aspect of the present disclosure includes an aircraft window mounting assembly having a compliant bezel defining an inner opening. The compliant bezel includes an inner wall having a channel. A dust cover is proximate the compliant bezel. An electro-optic element is disposed in the opening and is configured for reception in the channel of the inner wall. The pressure pane, the compliant bezel, and the electro-optic element define an exterior cavity. The compliant bezel, the electro-optic element, and the dust cover define an interior cavity. A first relief passage is in fluid communication with the exterior cavity and the interior cavity. A second relief passage is in fluid communication with the interior cavity and an expansion bellows mechanism.

Yet another aspect of the present disclosure includes an aircraft window mounting assembly having a foam bezel proximate a periphery of the pressure pane and defining an inner opening. The foam bezel includes an inner wall, an outer wall, an exterior wall, and an interior wall. The inner wall includes a channel. An electro-optic element is disposed in the opening and is configured for reception in the channel of the inner wall. The foam bezel at least partially defines an exterior cavity. The foam bezel also at least partially defines an interior cavity. A first relief passage extends through the foam bezel and is in fluid communication with the exterior cavity and the interior cavity. A second relief passage extends through the foam bezel and is in fluid communication with the interior cavity and one of an aircraft interior cabin and an aircraft wall.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features of the other embodiments.

DETAILED DESCRIPTION OF EMBODIMENTS

Figure 1:
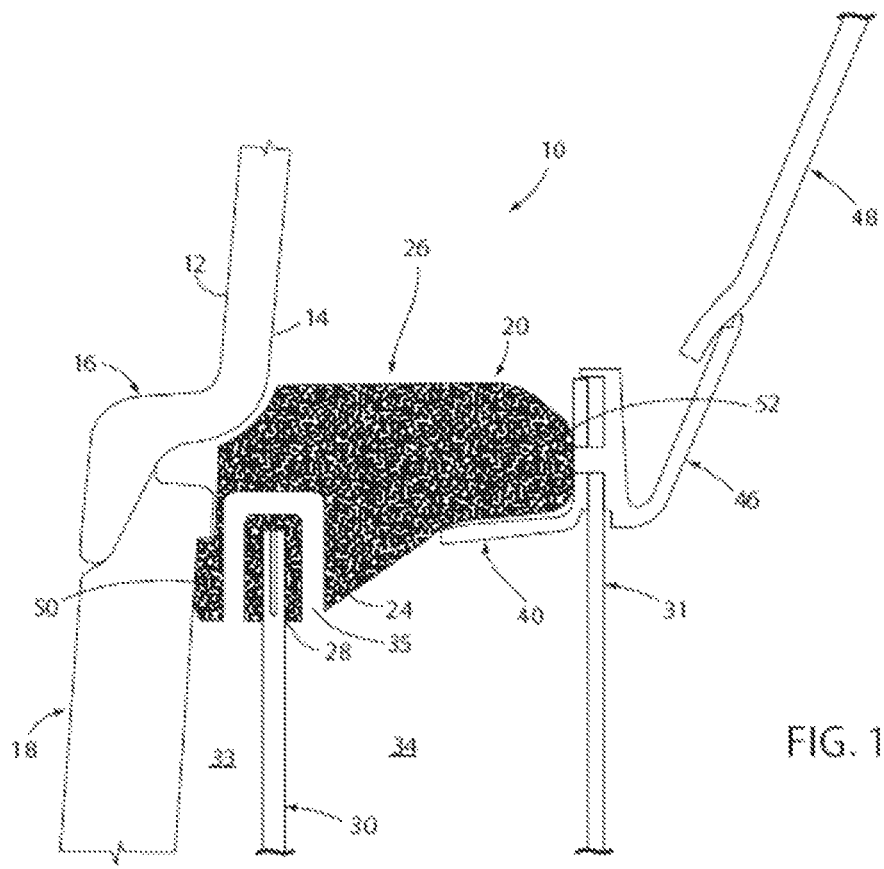
FIG. 1 is an enlarged side cross-sectional view of a top portion of one embodiment of an aircraft window foam mounting assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2A:
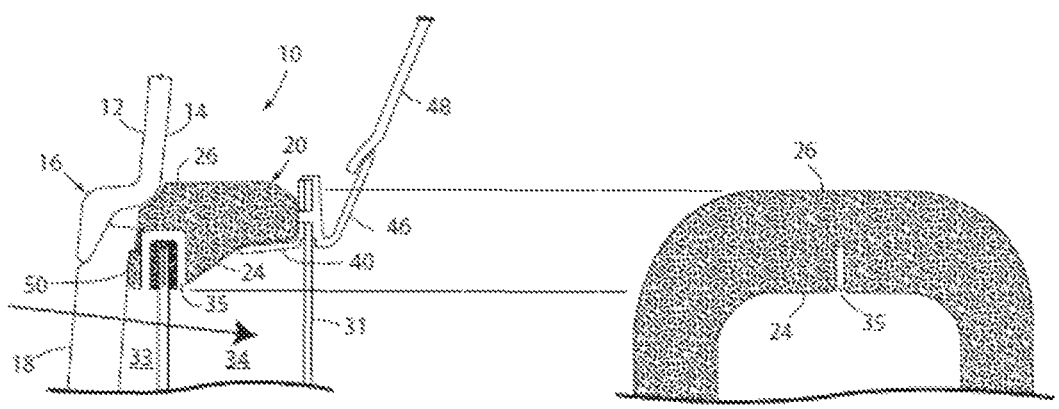
FIG. 2A is a partial side cross-sectional view of an embodiment of an aircraft window foam mounting assembly of the present disclosure.
Figure 2B:
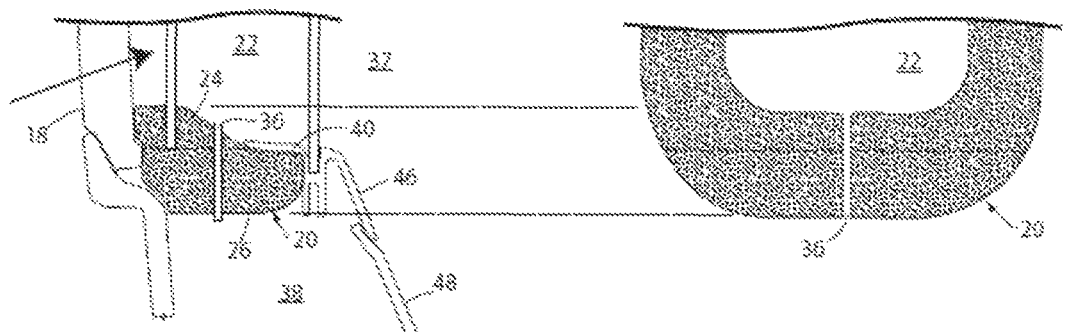
FIG. 2B is a partial side cross-sectional view of a bezel of the present disclosure.

Referring to FIGS. 1, 2A, and 2B, reference numeral 10 generally designates a dimmable window mounting assembly for an aircraft including an exterior pressure pane frame 12 having an inner surface 14 and an outer surface 16. A pressure pane 18 is in abutting contact with the inner surface 14 of the exterior pressure pane frame 12. A bezel 20 is proximate a periphery of the pressure pane 18 and defines an inner opening 22. The bezel 20 includes an inner wall 24 and an outer wall 26. Bezel 20 may be generally flexible, conforming, or otherwise compliant and, in an example may be of foam or another compliant material. The inner wall 24 includes a channel 28. A dust cover 31 is proximate an interior wall 52 of the bezel 20. An electro-optic element 30 is disposed in the inner opening 22 and is configured for reception in the channel 28 of the inner wall 24. The pressure pane 18, the bezel 20, and the electro-optic element 30 define an exterior cavity 33. The bezel 20, the electro-optic element 30, and the dust cover 31 define an interior cavity 34. A first relief passage 35 is in fluid communication with the exterior cavity 33 and the interior cavity 34. A second relief passage 36 is in fluid communication with the interior cavity 34 and one of an aircraft interior cabin 37 and an aircraft wall 38.

With reference again to FIGS. 1, 2A, and 2B, the bezel 20 is generally configured to nest between an outer reveal 40 and the exterior pressure pane frame 12. The bezel 20, or foam mount, is also proximate the pressure pane 18, and in the illustrated embodiment, is in abutting contact with the pressure pane 18. The pressure pane 18 generally defines a window through which passengers in an aircraft can view outside the aircraft. The channel 28 includes a depth and width configured to receive the electro-optic element 30 therein. The electro-optic element 30 is generally disposed between the pressure pane 18 and the dust cover 31. The dust cover 31 is held in place by an inner reveal 46, which is subsequently held in place by an interior sidewall 48. The interior sidewall 48 may include an interior trim to provide an aesthetically pleasing appearance inside an aircraft fuselage.

As illustrated in FIGS. 1, 2A, and 2B, it is contemplated that the bezel 20 may take on a variety of shapes, materials, and configurations that will generally define a frame-like structure. Regardless of the construction, the dimmable window mounting assembly 10 will include the inner wall 24 and the channel 28, as well as the outer wall 26. An exterior wall 50 of the bezel 20 is configured to abut one or both of the pressure pane 18 and the pressure pane frame 12. The bezel 20 also includes the interior wall 52 configured to abut or nearly abut the outer reveal 40. In one instance, the bezel 20 is constructed by introduction of a foaming material into a mold cavity of a low pressure molding assembly. The molding process is initiated, and the bezel 20, which may include open cell or closed cell foam, is withdrawn from the mold.

With reference to FIGS. 2A and 2B, the illustrated embodiment of an aircraft window mounting assembly depicts the first relief passage 35, which is in fluid communication with the exterior cavity 33 that is defined by the pressure pane 18, the bezel 20, and the electro-optic element 30. The first relief passage 35 is also in fluid communication with the interior cavity 34, which is defined by the bezel 20, the electro-optic element 30, and the dust cover 31. Accordingly, the first relief passage 35 aids in maintaining a generally consistent temperature in both the exterior cavity 33 and the interior cavity 34, as well as maintaining a substantially consistent pressure. In addition to the first relief passage 35, which is disposed at an upper portion of the bezel 20, a second relief passage 36 is provided in a bottom portion of the bezel 20 and is in fluid communication with an intermediate portion of the aircraft wall 38. Alternatively, it is contemplated that the second relief passage 36 may provide fluid communication between the interior cavity 34 and the aircraft interior cabin 37. The first relief passage 35 is positioned at an upper portion of the bezel 20, such that warm air that can build up in the exterior cavity 33 is allowed to move to the interior cavity 34. Cool air in the interior cavity 34 is then forced downward through the second relief passage 36 and into one of the aircraft interior cabin 37 and the aircraft wall 38. Although the illustrated embodiment in FIGS. 2A and 2B shows the first relief passage 35 at an upper portion of the bezel 20 and the second relief passage 36 at a lower portion of the bezel 20, it is also contemplated that the position of the first relief passage 35 and the second relief passage 36 may be switched, such that the first relief passage 35 is disposed at a bottom portion of the bezel 20 and the second relief passage 36 is positioned at an upper portion of the bezel 20. It is also contemplated that the second relief passage 36 could be in fluid communication with the interior cavity 34 and an expansion bellows mechanism disposed, for example, in the aircraft wall 38.

The construction as illustrated in FIGS. 2A and 2B is generally defined to minimize condensation build-up that can occur as a result of the relative temperature and humidity differences between the exterior cavity 33 and the interior cavity 34, and the aircraft interior cabin 37 or aircraft wall 38. The construction generally limits the free-exchange of moist interior cabin air with the air in the interior cavity 33, thereby minimizing the build-up of condensation on the interior of the cold pressure pane 18. Although the first relief passage 35 is shown as a relatively direct path between exterior cavity 33 and interior cavity 34, an alternative relief passage may include a longer, tortuous path between exterior cavity 22 and interior cavity 34, which may further limit the exchange of moisture between the cavities.

At the same time, the temperature controlled system illustrated in FIGS. 2A and 2B lessens excessive heat that may otherwise build up on the electrochromic element 30, which could result in degraded performance of the electro-optic element 30. One of ordinary skill in the art will appreciate that the electro-optic element 30 may be an electrochromic element or other dimming element such as those shown and described in commonly assigned U.S. Pat. No. 8,547,624, entitled "VARIABLE TRANSMISSION WINDOW SYSTEM," filed on Jun. 29, 2011, the entire disclosure of which is hereby incorporated herein by reference.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. An aircraft window mounting assembly comprising:
   a pressure pane in abutting contact with an inner surface of an exterior pressure pane frame;
   a bezel proximate a periphery of the pressure pane and defining an inner opening, the foam bezel including an inner wall, an outer wall, an exterior wall, and an interior wall;
   a dust cover proximate the interior wall of the bezel;
   an electro-optic element disposed in the opening and configured for reception by the inner wall, wherein the pressure pane, the bezel, and the electro-optic element define an exterior cavity, and wherein the bezel, the electro-optic element, and the dust cover define an interior cavity;
   a first relief passage in fluid communication with the exterior cavity and the interior cavity; and
   a second relief passage in fluid communication with the interior cavity and one of an aircraft interior cabin and an aircraft wall.

2. The aircraft window mounting assembly of claim 1, further comprising:
   an outer reveal and an inner reveal, wherein the dust cover is disposed between the outer reveal and the inner reveal.

3. The aircraft window mounting assembly of claim 1, wherein the first relief passage includes a U-shaped cross-section that extends around the electro-optic element.

4. The aircraft window mounting assembly of claim 1, wherein the electro-optic element is an electrochromic element.

5. The aircraft window mounting assembly of claim 1, wherein the second relief passage is includes a linear configuration that extends generally vertically through a lower portion of the bezel.

6. The aircraft window mounting assembly of claim 1, wherein the bezel is juxtaposed proximate both the exterior pressure pane frame and the pressure pane.

7. The aircraft window mounting assembly of claim 1, wherein the bezel alone defines the first relief passage.

8. The aircraft window mounting assembly of claim 1, wherein the bezel alone defines the second relief passage.

9. An aircraft window mounting assembly comprising:
   a compliant bezel defining an inner opening, the compliant bezel including an inner wall having a channel;
   a dust cover proximate the compliant bezel;
   an electro-optic element disposed in the opening and configured for reception in the channel of the inner wall, wherein the pressure pane, the compliant bezel, and the electro-optic element define an exterior cavity, and wherein the compliant bezel, the electro-optic element, and the dust cover define an interior cavity;
   a first relief passage in fluid communication with the exterior cavity and the interior cavity; and
   a second relief passage in fluid communication with the interior cavity and an expansion bellows mechanism.

10. The aircraft window mounting assembly of claim 9, further comprising:
    An outer reveal and an inner reveal, wherein the dust cover is disposed between the outer reveal and the inner reveal.

11. The aircraft window mounting assembly of claim 9, wherein the first relief passage includes a U-shaped cross-section that extends around the electro-optic element.

12. The aircraft window mounting assembly of claim 9, wherein the electro-optic element is an electrochromic element.

13. The aircraft window mounting assembly of claim 9, wherein the second relief passage includes a linear configuration that extends generally vertically through a lower portion of the bezel.

14. An aircraft window mounting assembly comprising:
    a foam bezel proximate a periphery of the pressure pane and defining an inner opening, the foam bezel including an inner wall, an outer wall, an exterior wall, and an interior wall, wherein the inner wall includes a channel;
    an electro-optic element disposed in the opening and configured for reception in the channel of the inner wall, wherein the foam bezel at least partially defines an exterior cavity and wherein the foam bezel also at least partially defines an interior cavity;
    a first relief passage extending through the foam bezel and in fluid communication with the exterior cavity and the interior cavity; and
    a second relief passage extending through the foam bezel and in fluid communication with the interior cavity and one of an aircraft interior cabin and an aircraft wall.

15. The aircraft window mounting assembly of claim 14, further comprising:
    a dust cover proximate the foam bezel.

16. The aircraft window mounting assembly of claim 14, further comprising:
    an outer reveal and an inner reveal, wherein the dust cover is disposed between the outer reveal and the inner reveal.

17. The aircraft window mounting assembly of claim 14, wherein the first relief passage includes a U-shaped cross-section that extends around the electro-optic element.

18. The aircraft window mounting assembly of claim 14, wherein the electro-optic element is an electrochromic element.

19. The aircraft window mounting assembly of claim 14, wherein the second relief passage includes a linear configuration that extends generally vertically through a lower portion of the foam bezel.

20. The aircraft window mounting assembly of claim 14, wherein the foam bezel is disposed proximate both a pressure pane and an exterior pressure pane frame.

* * * * *